United States Patent
Stein

(10) Patent No.: US 9,025,484 B2
(45) Date of Patent: May 5, 2015

(54) METHOD OF PROVIDING AN MMOIP COMMUNICATION SERVICE

(75) Inventor: Manuel Stein, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 137 days.

(21) Appl. No.: 13/806,542

(22) PCT Filed: Jul. 28, 2011

(86) PCT No.: PCT/EP2011/062984
§ 371 (c)(1),
(2), (4) Date: Jan. 17, 2013

(87) PCT Pub. No.: WO2012/028397
PCT Pub. Date: Mar. 8, 2012

(65) Prior Publication Data
US 2013/0155839 A1    Jun. 20, 2013

(30) Foreign Application Priority Data

Aug. 31, 2010    (EP) .................................... 10290464

(51) Int. Cl.
| | |
|---|---|
| *H04L 12/26* | (2006.01) |
| *H04L 29/06* | (2006.01) |
| *H04L 12/801* | (2013.01) |
| *H04L 12/931* | (2013.01) |
| *H04L 12/851* | (2013.01) |

(52) U.S. Cl.
CPC .......... *H04L 29/06183* (2013.01); *H04L 43/18* (2013.01); *H04L 47/10* (2013.01); *H04L 47/2441* (2013.01); *H04L 49/355* (2013.01); *H04L 65/1006* (2013.01); *H04L 65/1016* (2013.01); *H04L 65/1043* (2013.01); *H04L 65/104* (2013.01); *H04L 65/80* (2013.01); *H04L 65/10* (2013.01)

(58) Field of Classification Search
CPC ... H04L 29/06183; H04L 43/18; H04L 47/10; H04L 49/355; H04L 65/10
USPC .......................................................... 370/252
See application file for complete search history.

(56) References Cited

U.S. PATENT DOCUMENTS

| | | | |
|---|---|---|---|
| 2001/0030958 A1 | 10/2001 | Kichise | |
| 2006/0209807 A1 | 9/2006 | Lor et al. | |
| 2008/0267216 A1* | 10/2008 | Vergnaud | ...................... 370/474 |

FOREIGN PATENT DOCUMENTS

WO    WO-2005109788 A2    11/2005

OTHER PUBLICATIONS

International Search Report (PCT/ISA/210) for International Application No. PCT/EP2011/062984 dated Nov. 7, 2011.
Written Opinion of the International Searching Authority (PCT/ISA/237) for International Application No. PCT/EP2011/062984 dated Nov. 7, 2011.
Technical Specification 23.228. 3rd Generation Partnership Project. Mar. 2001.

* cited by examiner

*Primary Examiner* — Melvin Marcelo
(74) *Attorney, Agent, or Firm* — Harness, Dickey & Pierce

(57) ABSTRACT

One or more MMoIP packet streams are transmitted via a connection established between a first and second endpoint of an IP communication network. The one or more MMoIP packet streams include MMoIP payload data and/or control data. Control data directed to a processor is inserted in at least one MMoIP packet stream of the one or more MMoIP packet streams at the first endpoint and/or the second endpoint. The one or more MMoIP packet streams are transmitted via an MMoIP switch of the IP communication network. The MMoIP switch monitors the one or more MMoIP packet streams. The MMoIP switch detects the control data directed to the processor. The MMoIP switch forwards the detected control data to the processor.

12 Claims, 8 Drawing Sheets

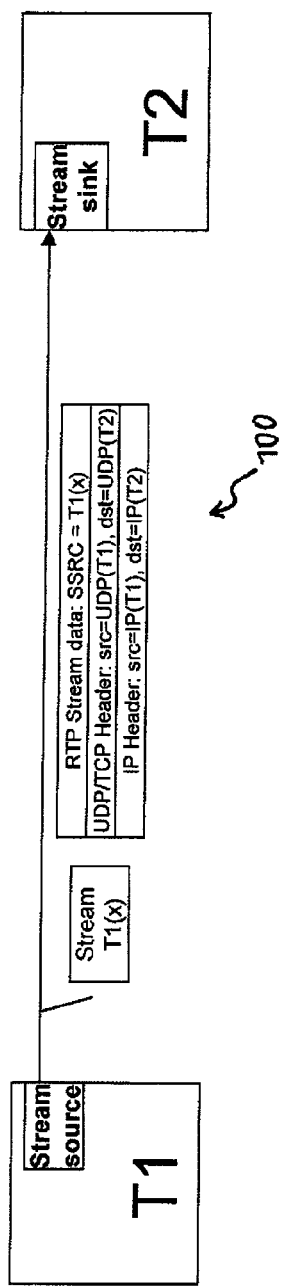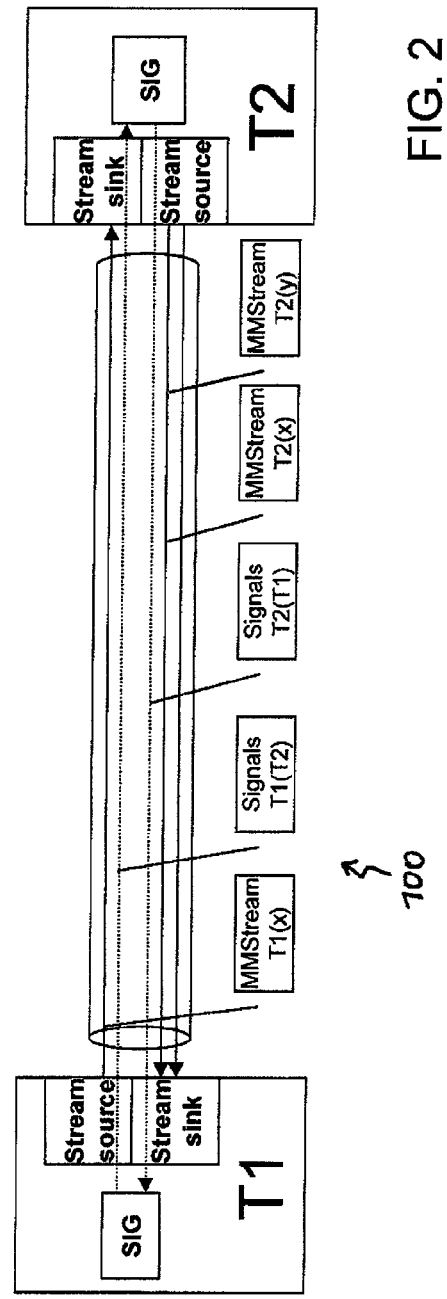

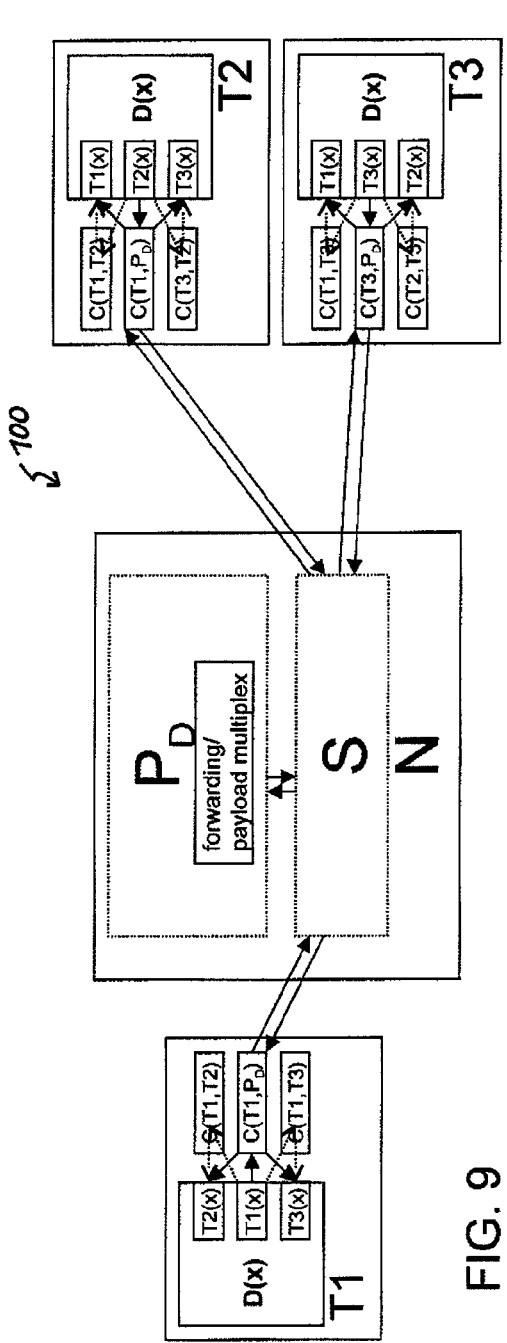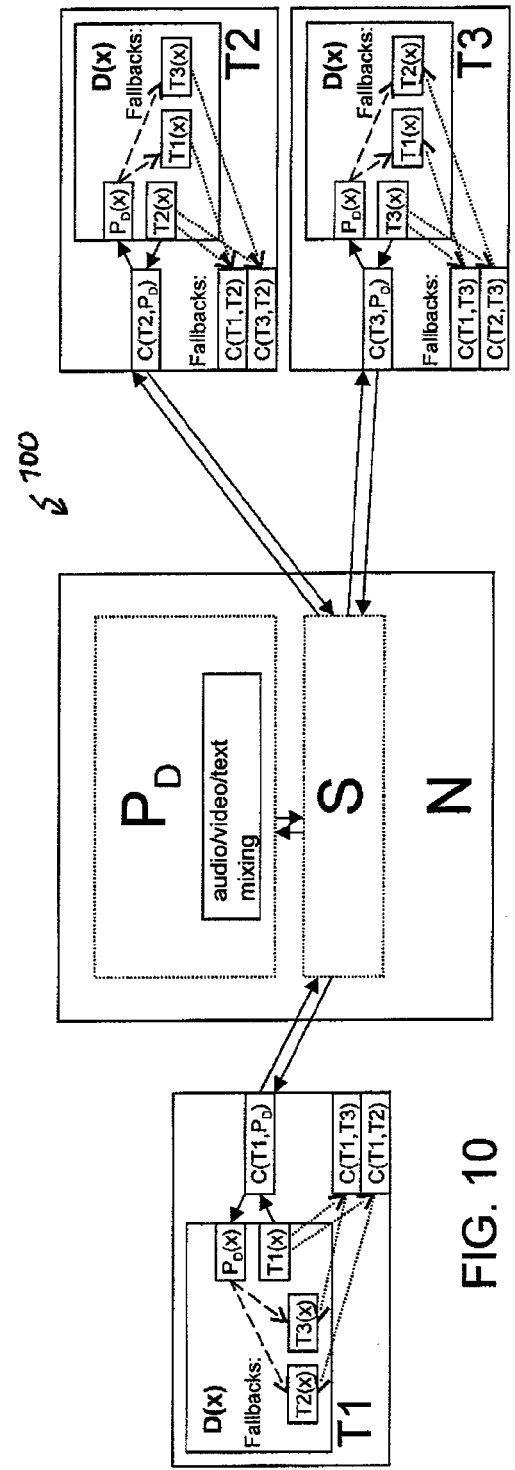
FIG. 9
FIG. 10

METHOD OF PROVIDING AN MMOIP COMMUNICATION SERVICE

FIELD OF INVENTION

The invention concerns a method of providing an MMoIP communication service, and a MMoIP system to execute the said method (MMoIP=MM over IP; MM=Multimedia; IP=Internet Protocol).

BACKGROUND

MMoIP refers to providing multiple services, such as text, still image, data, audio (e.g. voice, music), moving image (e.g. video), animation, and interactivity content forms, using the packet technology over an IP network.

TS 23.228 published by the 3GPP (=3rd Generation Partnership Project) describes the IP Multimedia Subsystem (=IMS). IMS is an architectural framework for providing MMoIP solutions. However IMS has shortcomings, e.g. since, with the Cloud computing paradigm, carriers, ISPs and ASPs are stacked rather than separated in autonomous IP subnets, since the 3GPP has adopted a pure end-to-end protocol for signalling, cf. IETF SIP/RTP call architecture, or since multimedia telecommunication has been introduced as an additional Internet service overlay rather than being regarded at the same level as transport protocol level, e.g. TCP, UDP, SCTP (ISP=Internet Service Provider; ASP=Application Service Provider; IETF=Internet Engineering Task Force; SIP=Session Initiation Protocol; RTP=Real-Time Transport Protocol; TCP=Transmission Control Protocol; UDP=User Datagram Protocol; SCTP=Stream Control Transmission Protocol).

It is the object of the present invention to provide an improved MMoIP communication service.

SUMMARY

The object of the present invention is achieved by a method of providing an MMoIP communication service, comprising the steps of transmitting one or more MMoIP packet streams via a connection established between a first endpoint of an IP communication network and a second endpoint of the IP communication network, whereby the one or more MMoIP packet streams comprise MMoIP payload data and/or control data; inserting control data directed to a processor in at least one MMoIP packet stream of the one or more MMoIP packet streams at the first endpoint and/or the second endpoint; transmitting the one or more MMoIP packet streams via an MMoIP switch of the IP communication network; monitoring, by the MMoIP switch, the one or more MMoIP packet streams; detecting, by the MMoIP switch, the control data directed to the processor; and forwarding, by the MMoIP switch, the detected control data to the processor. The object of the present invention is further achieved by a MMoIP system for providing an MMoIP communication service in an IP communication network, comprising a first endpoint and a second endpoint which are adapted to send one or more MMoIP packet streams via a connection established between the first endpoint and the second endpoint and to insert control data directed to a processor in at least one MMoIP packet stream of the one or more MMoIP packet streams, whereby the one or more MMoIP packet streams comprise MMoIP payload data and/or control data, and comprising an MMoIP switch adapted to monitor the one or more MMoIP packet streams which are transmitted via the MMoIP switch, detect the control data directed to the processor and forward the detected control data to the processor.

An endpoint according to the present invention is essentially equal to an IP endpoint, preferably as an unbound socket which can be identified and used by any software running on the endpoint to send data into the MMoIP system. A connection according to the present invention is a communication among two endpoints. A connection according to the present invention is not required to have a connection setup or teardown, e.g. TCP, but the information transmitted can be of ad-hoc connectivity, e.g. UDP. A stream according to the present invention is a unidirectional sequence of data originating from an endpoint which has an individual identifier regardless of the connection. A dialogue according to the present invention is two or more unidirectional streams from different endpoints, preferably forming a bidirectional session under a common stream identifier. TCP, UDP and SCTP are examples for transport layer protocols used for a transmission of streaming media data via a network.

An endpoint can multiplex connections. A connection can multiplex streams. A stream can switch between the underlying connections. A response stream to an initial stream uses the same identifier to be recognizable as a dialogue.

Embodiments of the present invention provide a permanent multimedia switching service available to Internet endpoints. This is achieved by introducing a switching element, called "MMoIP switch", for a MMoIP communication service in an IP communication network, e.g. a telecommunication architecture, which can identify endpoints, e.g. in and outside (so-called "external endpoint") the switching domain, connections, streams and dialogues.

The MMoIP system provides interoperability with existing MMoIP technologies by re-using existing protocols for bearer data. Through its design the MMoIP system is adapted to achieve interoperability with a traditional bearer in existing MMoIP solutions, e.g. in VoIP system, by placing system border elements which translate traditional call control signalling to the indications used by the proposed MMoIP system (VoIP=Voice over IP). The invention also re-uses existing telecommunication service components. Thus the invention achieves a better integration with the existing Internet architecture than known MMoIP systems. Further, the MMoIP system is adapted to overlay the switching system according to embodiments of the present invention with the traditional call control signalling. However, it is to be noted that the present invention is not an overlay.

Rather than built on top of existing client/server-based services, the proposed MMoIP system is tightly integrated into IP to provide a MMoIP communication service in the way of end-to-end telecommunication, e.g. packet inspection is used for packet routing rather than a DNS overlay, signalling is inherently available among all processing elements without creating additional overhead (DNS=Domain Name System). The MMoIP system builds upon characteristics of end-to-end communication by leveraging the IP end-to-end paradigm. For example, the invention tightly integrates telecommunication with packet-based end-to-end addressing and transport socket connections. Since the invention is integrated with IP addressing, it achieves a better terminal mobility than known MMoIP systems.

The MMoIP system provides information contexts such as network-context, stream-context and dialog-context information which is easily distinguishable in order to create clearly described state machines.

The MMoIP system uses the flexibility for processing elements introduced by Cloud computing in order to overcome the telecommunication service silos. In particular, the MMoIP system makes instantiation and use of telecommunication services, e.g. on-stream modifications or mixing, available. The invention provides an auto-configuration of services in a self-consistent state model for MM service applications.

The continuous, permanent availability of the MMoIP communication service provided by the proposed method does not cause a disproportionately high OPEX (=Operational Expenditure). Only the use of the MMoIP communication service, i.e. the MMoIP transmission, requires provider resources. Therefore, the invention uses less resources, both computational and networking, for MMoIP bearer establishment and achieves a higher utilisation of resources than known MMoIP systems. Further the invention achieves a faster setup for MMoIP communication than known MMoIP systems.

Further advantages are achieved by embodiments of the invention indicated by the dependent claims.

According to an embodiment of the invention, the one or more MMoIP packet streams comply with the RTP protocol. Preferably the one or more MMoIP packet streams are RTP packet streams.

According to an embodiment of the invention, the method further comprises the step of inserting control data from the processor into at least one MMoIP packet stream of the one or more MMoIP packet streams.

According to an embodiment of the invention, the method further comprises the step of processing, by the processor, at least one MMoIP packet stream of the one or more MMoIP packet streams. With this embodiment it is preferred if the control data which are forwarded by the MMoIP switch to the processor control the processing of the at least one MMoIP packet stream of the one or more MMoIP packet streams by the processor.

According to an embodiment of the invention, monitoring by the MMoIP switch the one or more MMoIP packet streams comprises executing a packet inspection of the one or more MMoIP packet streams packet per packet, and distinguishing payload data and control data. The MMoIP system distinguishes signalling data, in particular best-effort data, and multimedia data, in particular real-time data, on a per-packet basis rather than creating complicated connection overlays for these two kinds of data.

According to an embodiment of the invention, the method further comprises the steps of inserting, at the first endpoint and/or the second endpoint, an indication in at least one MMoIP packet stream of the one or more MMoIP packet streams; detecting, by the MMoIP switch, the indication; triggered by the detected indication, setting up the processor for processing at least one MMoIP packet stream of the one or more MMoIP packet streams; and re-directing, by the MMoIP switch, the at least one MMoIP packet stream of the one or more MMoIP packet streams to the processor.

The MMoIP system is adapted to seamlessly add/remove processing elements to/from streams/dialogues, relocate processors, split and merge streams to/by dialogues across processing elements—either upon request or autonomously (i.e. "intelligently")—in order to achieve an optimal trade-off between a high quality of the MMoIP communication service provided and resource utilization in the IP communication network. Thus the MMoIP system provides an easy third party integration, e.g. as additional hardware in a node or as additional software upon IaaS (=Infrastructure as a Service).

According to an embodiment of the invention, the method further comprises the step of, if the MMoIP switch detects a failure of the processor, stopping, by the MMoIP switch, the forwarding of the control data to the processor. Thus failure of a processing element does not destroy the whole communication. The MMoIP system is capable of continuing telecommunication among endpoints, even if network elements, such as switching elements, stream processors or dialogue processors fail. The MMoIP system inherently provides failover techniques and thus provides a better reliability of IP communications than known MMoIP systems due to successive addition in a model which preserves setup and fallbacks without interruption.

In case of the MMoIP switch re-directing at least one MMoIP packet stream of the one or more MMoIP packet streams to the processor, it is preferred that the MMoIP switch, if the MMoIP switch detects a failure of the processor, controls a fall-back of the at least one MMoIP packet stream on the connection without passing the processor.

According to an embodiment of the invention, the method further comprises the steps of indicating, by the processor, a need for an additional processor to the MMoIP switch; triggered by the said indication received from the processor, instantiating, by the MMoIP switch, the additional processor; re-directing, by the MMoIP switch, the at least one MMoIP packet stream to the additional processor; and sending, by the additional processor, its output of the at least one MMoIP packet stream to the processor. The MMoIP switch is adapted to react on indications sent by receiving endpoints to include processing elements, whereby a processing element can be a) a stream processor which operates on MMoIP packet streams without being an endpoint itself and b) a dialogue processor which introduces itself to the exchange of the MMoIP packet streams as a new endpoint.

According to another embodiment of the invention, the processor is a dialogue processor for processing a bidirectional dialogue between the first endpoint and the second endpoint.

BRIEF DESCRIPTION OF THE FIGURES

These as well as further features and advantages of the invention will be better appreciated by reading the following detailed description of exemplary embodiments taken in conjunction with accompanying drawings of which:

FIG. 1 is a schematic block diagram of a connection between two endpoints of an IP communication network with a single stream;

FIG. 2 is a schematic block diagram of the connection of FIG. 1 with multiple streams and signalling;

FIG. 9 is a schematic block diagram of a MMoIP system with a multi-party dialogue;

FIG. 10 is a schematic block diagram of a MMoIP system with dialogue processor multiplexing.

DETAILED DESCRIPTION OF EMBODIMENTS

Figure 3:
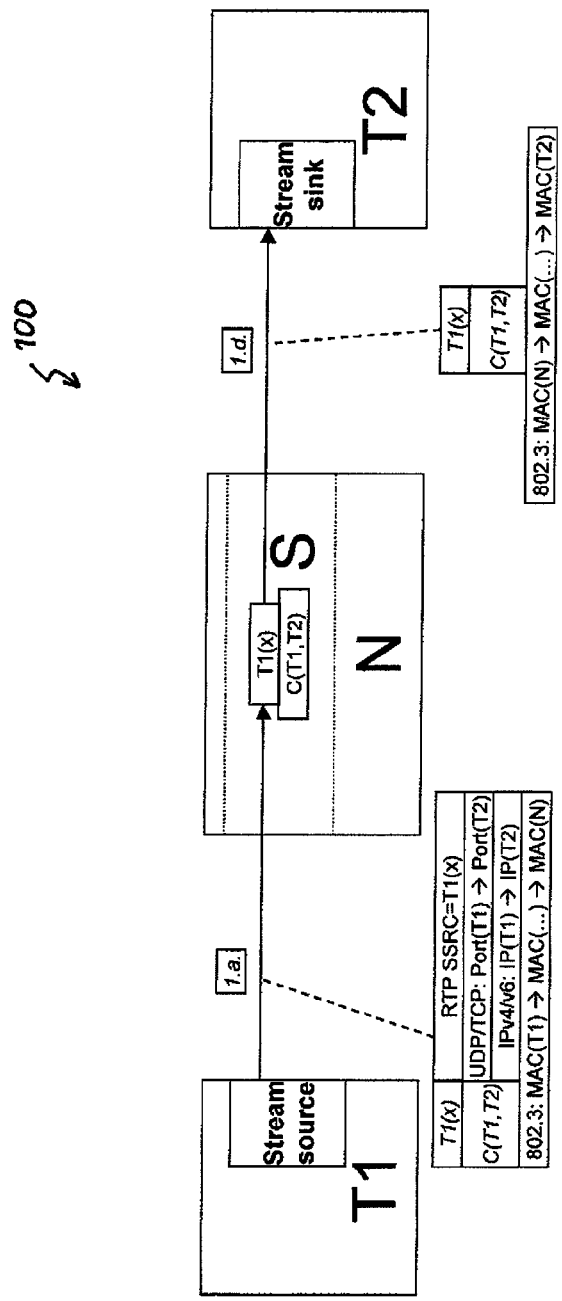
FIG. 3 is a schematic block diagram of a MMoIP system.

FIG. 1 is a schematic block diagram of a connection between a first endpoint T1 and a second endpoint T2 of an IP communication network 100 with a single stream T1(*x*). The endpoints T1 and T2 may be UDP sockets or TCP sockets of telecommunication devices adapted to send and receive IP packets, e.g. a computer connected via a fixed access (e.g. DSL) or a wireless access (e.g. WLAN) to the IP communication network, or a mobile phone connected via a mobile access (e.g. UMTS) to the IP communication network (DSL=Digital Subscriber Line; WLAN=Wireless LAN; LAN=Local Area Network; UMTS=Universal Mobile Telecommunications System). Each endpoint T1 and T2 is identified by a pair identifier consisting of an IP address and a port number: T1={IP address(T1), port (T1)}; T2={IP address (T2), port (T2)}.

A connection C, e.g. a UDP connection, a TCP connection or a SCTP channel, is established between the first endpoint T1 and the second endpoint T2. The connection C is identified by its endpoints T1 and T2: connection C=C(T1, T2).

A stream T1(*x*), e.g. a multimedia stream or a signalling stream, is transmitted via the connection C from a stream source, i.e. the first endpoint T1, to a stream sink, i.e. the second endpoint T2. The stream T1(*x*) is identified on the connection C by its stream source T1 and a stream identifier x: stream=T1(*x*).

A packet associated with the stream T1(*x*) and sent from the stream source T1 to the stream sink T2 comprises, on a first layer, RTP stream data in form of the synchronization source variable SSRC (=Synchronization Source; cf. RFC 1889). The SSRC variable is set to identify the stream: SSRC=T1(*x*). On a second layer, below the first layer, the packet comprises a UDP/TCP header which specifies the stream source T1 (src=UDP(T1)) and the stream destination T2 (dst=UDP(T2)) on this layer (src=source; dst=destination). On a third layer, below the second layer, the packet comprises an IP header which specifies the stream source T1 (src=IP(T1)) and the stream destination T2 (dst=IP (T2)) on this layer.

As mentioned before, both MMoIP user data and signalling/control data associated with the MMoIP user data are transmitted via the same connection C. Several methods exist for transmitting both MMoIP user data and signalling/control data associated with the MMoIP user data over a single connection between a first endpoint and a second endpoint, e.g. a single port connection, whereby the signalling/control data is used for establishing, maintaining and terminating a transmission connection.

A preferred "traffic separation" method for providing a real-time communication connection over an IP communication network between a first entity and a second entity is described in the following. The "traffic separation" method comprises the steps of fragmenting signalling traffic and/or control traffic and/or other non-real-time traffic associated with the real-time communication connection at the first entity; multiplexing the fragments of the signalling traffic and/or control traffic and/or other non-real-time traffic into a real-time traffic stream of the communication connection and generating a resulting data stream comprising the packets of the real-time traffic stream multiplexed with the fragments of the signalling traffic and/or control traffic and/or other non-real-time traffic at the first entity; transmitting said data stream via an IP-based real-time communication connection from the first entity to the second entity; de-multiplexing said data stream and obtaining the fragments of the signalling traffic and/or control traffic and/or other non-real-time traffic and the real-time traffic stream of the communication connection at the second entity; re-composing the fragments of the signalling traffic and/or control traffic and/or other non-real-time traffic and generating the original signalling traffic and/or control traffic and/or other non-real-time traffic at the second entity. The term multiplexing refers to the combination of two or more information channels onto a common transmission medium. The term interleaving denotes a special type of multiplexing which involves the re-sorting and the nesting of bits. Interleaving is a way to arrange data in a non-contiguous way to increase performance. Therefore the term multiplexing is meant to also comprise the process of interleaving. The preferred "traffic separation" method makes it possible that a complete media session can be easily forwarded to a new access point via simple IP forwarding. Preferably the signalling and control messages are multiplexed/interleaved with the real-time data using any common and suitable transmission protocol. Preferred protocols for the transmission of the multiplexed stream are RTP, UDP, UDP lite, IP. For example, the fragments of the signalling and/or control traffic are multiplexed into the real-time traffic stream of the communication connection by generating separate data stream packets for the signalling and/or control traffic and the real-time traffic, whereby each data stream packet comprises an IP header, a UDP header, information about the type of the payload, namely signalling traffic, control traffic, or real-time traffic, a stream ID, a sequence number, information about the length of the payload, and the payload of the signalling traffic or control traffic or real-time traffic. Thus this preferred "traffic separation" method comprises a multiplexing of RTP and UDP in a one socket connection.

Another "traffic separation" method may use a marking of signalling/control data packets so that the signalling/control data packets can be distinguished from the MMoIP user data packets, although both use a single port. For example, MMoIP user data packets contain an (IP+UDP/TCP) header and RTP stream data, whereas signalling/control data packets contain a (IP+UDP/TCP) header, a two bit zero marking, i.e. a so-called "magic sequence", and signalling/control data.

FIG. 2 is a schematic block diagram based on FIG. 1 with multiple streams and signalling. The difference between FIG. 1 and FIG. 2 is that the connection shown in FIG. 2 comprises multiple streams whereas the connection shown in FIG. 1 comprises a single stream. The first endpoint T1 comprises a stream source module, a stream sink module, and a signalling module SIG. The second endpoint T2 comprises a stream source module, a stream sink module, and a signalling module SIG. A first MM stream T1(*x*) is transmitted via the connection C from the stream source module of the first endpoint T1 to the stream sink module 22 of the second endpoint T2. A second MM stream T2(*x*) is transmitted via the connection C from the stream source module of the second endpoint T2 to the stream sink module of the first endpoint T1. The two MM streams T1(*x*) and T2(*x*) are identified with the same MM stream identifier x and are transmitted between the endpoints T1 and T2 in opposite directions; therefore they represent a bi-directional or conversational MM dialogue D(x)=D(T1(*x*), T2(*x*)).

A third MM stream T2(*y*) is transmitted via the connection C from the stream source module of the second endpoint T2 to the stream sink module of the first endpoint T1. The MM stream T2(*y*) is identified by the MM stream identifier y. This MM stream T2(*y*) has not (yet) a counterpart MM stream which is transmitted between the endpoints T1 and T2 in the opposite direction of the stream T2(*y*); therefore the MM stream T2(*y*) represents a uni-directional MM dialogue D(y)= T2(*y*).

A signalling stream T1(T2) is transmitted via the connection C from the signalling module SIG of the first endpoint T1 to the signalling module SIG of the second endpoint T2. A second signalling stream T2(T1) is transmitted via the connection C from the signalling module SIG of the second endpoint T2 to the signalling module SIG of the first endpoint T1. These two signalling streams T1(x) and T2(x) are transmitted between the endpoints T1 and T2 in opposite directions; therefore they represent a signalling dialogue D(T1, T2)=D(T1(T2), T2(T1)). It is possible that the signalling dialogue D(T1, T2) is associated with the above mentioned conversational MM dialogue D(x)=D(T1(x), T2(x)).

FIG. 3 is a schematic block diagram of a MMoIP system comprising a first endpoint T1 and a second endpoint T2 in an IP communication network 100, e.g. the Internet. The MMoIP system shown in FIG. 3 is similar to the IP communication network 100 shown in FIG. 1, except that the MMoIP system shown in FIG. 3 further comprises a node N wherein a MMoIP switch S is implemented, e.g. in form of an additional switching module. A MMoIP packet stream T1(x) sent from the first endpoint T1 of the IP communication network 100 to the second endpoint T2 of the IP communication network 100 is transmitted via a connection C(T1,T2) established between the first endpoint T1 and the second endpoint T2. The MMoIP packet stream T1(x) comprises MMoIP payload data and/or control data.

In a first step 1.a., a MMoIP packet stream T1(x) comprising MMoIP payload data and/or control data is sent under the Ethernet standard 802.3 from the stream source of the first endpoint T1 to the node N. A packet of the MMoIP packet stream T1(x) comprises, on a first layer, an RTP synchronization source variable SSRC: SSRC=T1(x). On a second, lower layer, the packet comprises a UDP/TCP header which specifies a port Port(T1) of the stream source endpoint T1 and a port Port(T2) of the stream sink endpoint T2. On a third, lower layer, the packet comprises an IPv4/v6 header which specifies an IP address IP(T1) of the stream source endpoint T1 and an IP address IP(T2) of the stream sink endpoint T2. Preferably, the IP address IP(T1) of the stream source endpoint T1 is a public IP address, thus including NAT cases (NAT=Network Address Translation). The connection C(T1, T2) is associated with the UDP/TCP header and the IPv4/v6 header.

Furthermore the packet is provided at the first endpoint T1, on a link layer, with a source MAC address MAC(T1) according to the Ethernet standard 802.3 associated with the stream source, i.e. the first endpoint T1, and a destination MAC address MAC(N) associated with the node N (MAC=Media Access Control). Using the MAC addresses, the packet is routed from the first endpoint T1 hop-by-hop across the IP communication network 100 to the node N by means of the MAC addresses: MAC(T1)→MAC( . . . )→MAC(N).

The MMoIP switch S is composed of one or several interlinked computers, i.e. a hardware platform, a software platform basing on the hardware platform, and several application programs executed by the system platform formed by the software and hardware platform. The functionality of the MMoIP switch S is provided by the execution of these application programs. The application programs or a selected part of these application programs constitute a computer software product providing a switching service as described in the following, when executed on the system platform. Further, such computer software product is constituted by a storage medium storing these application programs or said selected part of application programs.

The MMoIP switch S may be an extension to an Ethernet switch, preferably on top of 802.3 Ethernet, monitoring traffic suggested for further treatment in a processing element. Therefore the MMoIP switch S can be located at any location within the IP communication network in co-existence with existing switching equipment across the IP communication network. External endpoints only require a piece of software to benefit from a co-operation with the MMoIP switch S.

The switching of the IP packet via the MMoIP switch S can be based on traffic separation, examples of which are described above. Other solutions for switching of the IP packet via the switch S are encapsulation of the stream IP-IP tunnels, GRE tunnels, VLAN, MPLS, IP over ATM (GRE=Generic Routing Encapsulation; VLAN=Virtual LAN; MPLS=Multi-Protocol Label Switching; ATM=Asynchronous Transfer Mode).

In a second step 1.d., the MMoIP packet stream T1(x) is sent under the Ethernet standard 802.3 from the node N to the stream sink of the second endpoint T2. While the MMoIP switch S does not change the MMoIP packet stream T1(x) and the connection C(T1, T2), the MMoIP switch S replaces the destination MAC address MAC(N) with the MAC address MAC(T2) associated with the second endpoint T2. Using the MAC addresses, the packets of the MMoIP packet stream T1(x) are routed from the node N hop-by-hop across the IP communication network 100 to the second endpoint T2 by means of the MAC addresses: MAC(N)→MAC( . . . )→MAC(T2).

Since the UDP/TCP headers used in the "single-connection" (i.e. comprising payload data and signalling/control data) MMoIP stream packets are identical to UDP/TCP headers of "normal" (i.e. where payload data and signalling/control data are transmitted on different channels/connections) traffic, the "single-connection" MMoIP stream packets which belong to the connection C(T1, T2) must be identified. On connection initialization, this identification can, e.g., be provided by one of the following methods:

1. Packet inspection: With packet inspection, the first packet transmitted via a connection C(T1, T2) is inspected and identified so that subsequent packets transmitted via the connection can be treated using UDP/TCP connection tracking. For example, an RTP traffic detection can be achieved by a hashing over IP source and destination values present in the IP header and UDP source and destination values present in the UDP header (IPsrc+IPdst+UDPsrc+UDPdst) as connection identifier and further statistical valuation of the first bytes in the UDP payload on UDP connections to detect potential RTP headers.
2. Explicit invitation: An explicit invitation to classify a packet associated with a "single connection" is stated by a user, e.g. by using an additional signalling protocol.
3. Residential Gateway: A packets associated with a "single connection" is classified by a Residential Gateway, e.g. by configuration of a DSL router or by setting a DSCP value of the packet (ToS byte or class field in the IP header) to a certain value (DSCP=Differentiated Services Code Point; ToS=Type of Service).

Therefore, using, e.g., the aforementioned packet inspection approach, a packet associated with an RTP stream of a "single connection" could be identified by hashing over (IPsrc+IPdst+UDPsrc+UDPdst) and the RTP variable SSRC: IPsrc+IPdst+UDPsrc+UDPdst+SSRC.

Figure 4:
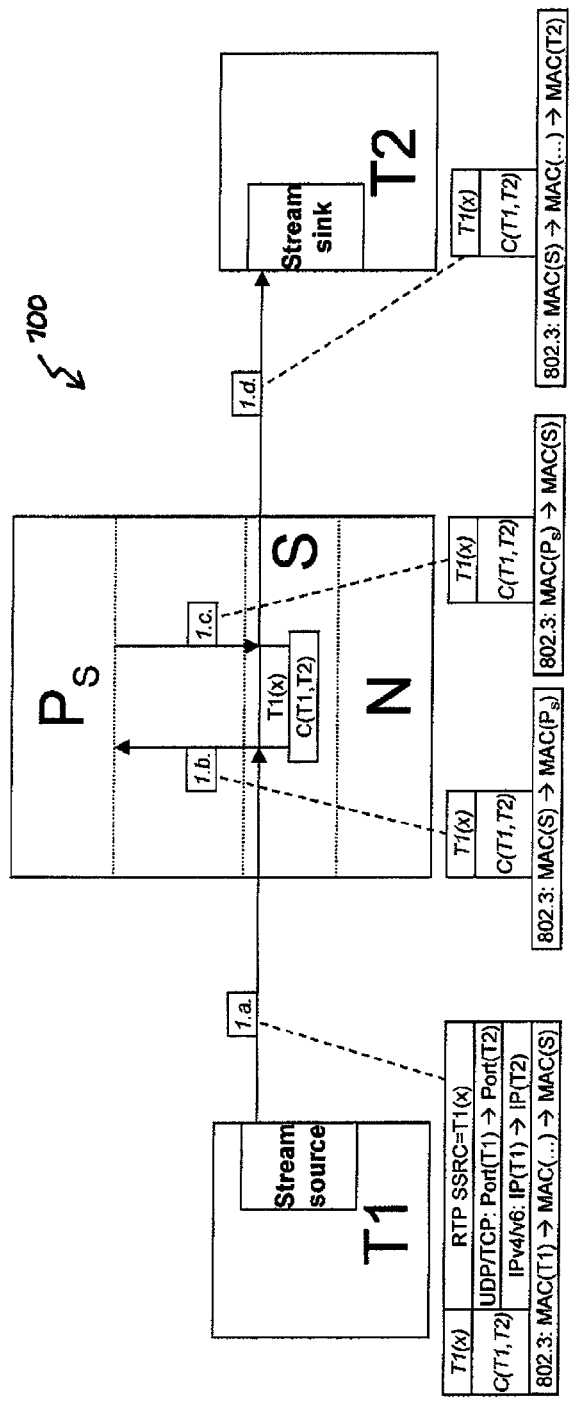
FIG. 4 is a schematic block diagram of a MMoIP system comprising a stream processor.

FIG. 4 is a schematic block diagram of a MMoIP system as illustrated in FIG. 3, further comprising a stream processor $P_S$. The seamless stream processor $P_S$ may be added on behalf of the first endpoint T1, the second endpoint T2 or the MMoIP switch S. The request to add a stream processor $P_S$ may be indicated to the MMoIP switch S by either the first endpoint T1 or the second endpoint T2 using the signalling stream T1(T2) or T2(T1) on the same connection C(T1,T2). The MMoIP switch S may detect that processing is required, e.g. to perform services for a VoIP connection such as an echo cancellation, a stream synchronization in case of multiple streams T1(x), T1(y), a loudness adaptation, etc. Indications can also be received using H.248, MEGACO (=Media Gateway Control Protocol), SOAP/XML (SOAP=Simple Object Access Protocol; XML=Extensible Markup Language).

The first step 1.a. shown in FIG. 4 corresponds to the first step 1.a. shown in FIG. 3, i.e. a MMoIP packet stream T1(x) comprising MMoIP payload data and/or control data is sent under the Ethernet standard 802.3 from the stream source of the first endpoint T1 to the node N. The MMoIP packet stream T1(x) comprises control data directed to the stream processor $P_S$. The control data have been inserted into the MMoIP packet stream T1(x) at the first endpoint T1. The MMoIP packet stream T1(x) is transmitted via the MMoIP switch S of the IP communication network 100.

Triggered by a corresponding indication, the MMoIP switch S switches the MMoIP packet stream T1(x) directed to the stream processor $P_S$. The MMoIP switch S changes the source MAC address and destination MAC address of the packets of the MMoIP packet stream T1(x) which are directed to the stream processor $P_S$ as follows: the source MAC address is the MAC address of the MMoIP switch S: MAC(S); the destination MAC address is the MAC address of the stream processor $P_S$: MAC($P_S$).

The MMoIP switch S monitors the MMoIP packet stream T1(x). If the MMoIP switch S detects control data directed to the stream processor $P_S$, the MMoIP switch S forwards the detected control data to the stream processor $P_S$. The MMoIP switch S and the stream processor $P_S$ are located on the same node N. The control data which are forwarded by the MMoIP switch S to the stream processor $P_S$ control the processing of the MMoIP packet stream T1(x) by the stream processor $P_S$.

After processing the MMoIP packet stream T1(x), the stream processor $P_S$ changes the source MAC address and destination MAC address of the packets of the MMoIP packet stream T1(x) as follows: the source MAC address is the MAC address of the stream processor $P_S$: MAC($P_S$); the destination MAC address is the MAC address of the MMoIP switch S: MAC(S). In a third step 1.c., the processed MMoIP packet stream T1(x) are transmitted back to the MMoIP switch S.

In a fourth step 1.d., the packets of the MMoIP packet stream T1(x) are sent from the node N to the stream sink of the second endpoint T2. The MMoIP switch S replaces the destination MAC address MAC(S) with the MAC address MAC (T2) associated with the second endpoint T2. Using the MAC addresses, the packets of the MMoIP packet stream T1(x) are routed from the MMoIP switch S hop-by-hop across the IP communication network 100 to the second endpoint T2 by means of the MAC addresses: MAC(S)→MAC( . . . )→MAC(T2).

Figure 5:
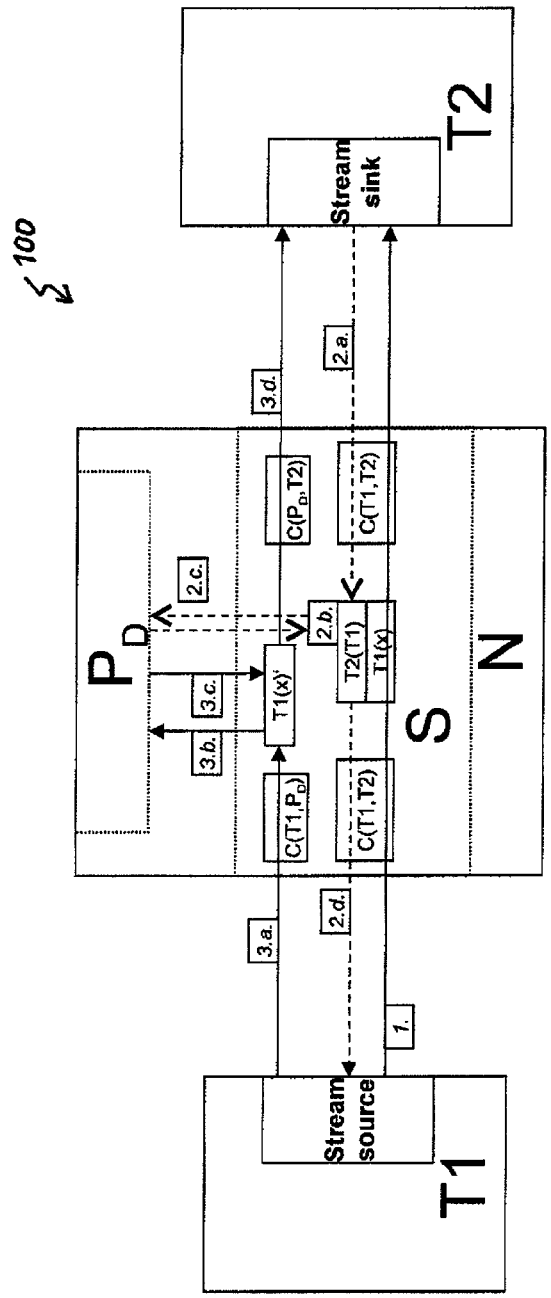
FIG. 5 is a schematic block diagram of a MMoIP system comprising a dialogue processor.

FIG. 5 is a schematic block diagram of a MMoIP system similar to the MMoIP system illustrated in FIG. 4, with the difference that the processor of FIG. 5 is not a stream processor but a dialogue processor $P_D$.

In a first step 1., a MMoIP packet stream T1(x) is transmitted via the connection C(T1,T2). It is possible that there exist signalling streams T1(T2) and T2(T1), i.e. on dialogue D(T1, T2). In a second step 2., an indication/request to include a processing, i.e. a processing service, is sent in a signalling stream T2(T1) from the second endpoint T2. In a step 2.a., the signalling stream T2(T1) comprises an indication of the second endpoint T2 "in the direction of" the first endpoint T1 to include a processing service. In a step 2.b., the MMoIP switch S which monitors the signalling stream T2(T1) pre-empts the detected indication. If none of the nodes in the IP communication network 100 can pre-empt/service the indication, the first endpoint T1 can also try to perform the processing. In a step 2.c., the MMoIP switch S sets up a dialogue processor service $P_D$, e.g. according to the RTP protocol. The MMoIP switch S waits for a response from the dialogue processor service $P_D$ while packet routing of the MMoIP packet stream T1(x) is not affected. The MMoIP switch S and the dialogue processor $P_D$ are located on the same node N. In a step 2.d., an indication created by the MMoIP switch S is sent on the signalling stream T2(T1) to send any further packets of the MMoIP packet stream T1(x) on an established connection C(T1,$P_D$) between the first endpoint T1 and the dialogue processor $P_D$.

In steps 3.a. to 3.d., further packets of the MMoIP packet stream T1(x), denoted as T1(x)', are sent by the first endpoint T1 on the connection C(T1,$P_D$) to the dialogue processor $P_D$ and, after processing, are sent by the dialogue processor $P_D$ on an established connection C($P_D$,T2) between the dialogue processor $P_D$ and the second endpoint T2. In a following step, signalling can now be transmitted in the signalling dialogues D(T1,T2), D(T1,$P_D$) and D($P_D$,T1).

The processing of the MMoIP packet streams T1(x) and T2(x), representing a MM dialogue D(x), by the dialogue processor $P_D$ may comprise a modification of the loudness or an echo cancellation of audio data of one or more of the streams T1(x) and T2(x), a recording of one or more of the streams T1(x) and T2(x), or an adding of additional data into one or more of the streams T1(x) and T2(x), e.g. an input of music data.

Preferably, the receiver of a MMoIP packet stream indicates the re-routing of the stream. Additional signalling may trigger the receiver to send an indication.

Figure 6:
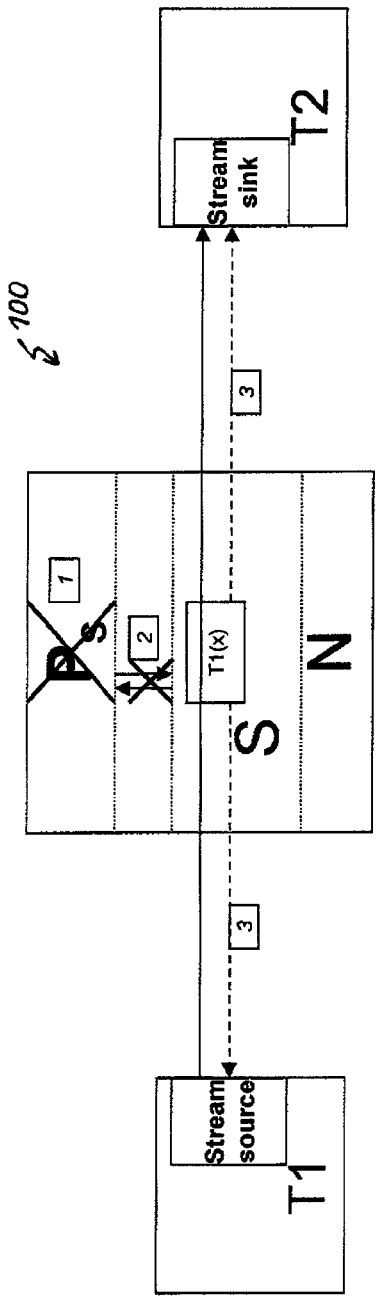
FIG. 6 is a schematic block diagram of a MMoIP system comprising a failed stream processor.

FIG. 6 is a schematic block diagram of stream processor failover in a MMoIP system comprising a failed stream processor $P_S$. As a precondition, a stream processor service $P_S$ was added to a connection to handle the MMoIP packet stream T1(x). When the stream processor service $P_S$ fails (step 1), the MMoIP switch S detects the failure (step 2), e.g. an Ethernet link or blade failure is detected by missing packets from the stream processor service $P_S$. After detecting the failure (step 2), the MMoIP switch S stops the redirection of the MMoIP packet stream T1(x) to the stream processor $P_S$, and indicates the failure of the stream processor $P_S$ to the endpoints T1 and/or T2 (step 3). Failure indication, created by the MMoIP switch S, may be sent on the signalling dialogues T1(T2) and/or T2(T1). Then the MMoIP packet stream T1(x) continues without a processing of the MMoIP packet stream T1(x) by the stream processor $P_S$. The second endpoint T2 may request the same service again, which can then be performed by another node or processor.

A stream processing node failover where all the processor P is affected is a system operator failover where the packets of a MMoIP packet stream T1(x) can be simply routed from the first endpoint T1 to the second endpoint T2 without implications. Also, the MMoIP packet stream T1(x) can be handled by another MMoIP switch and serviced by another processor $P_S$ whereby the activated service is known to the system operator.

Figure 7:
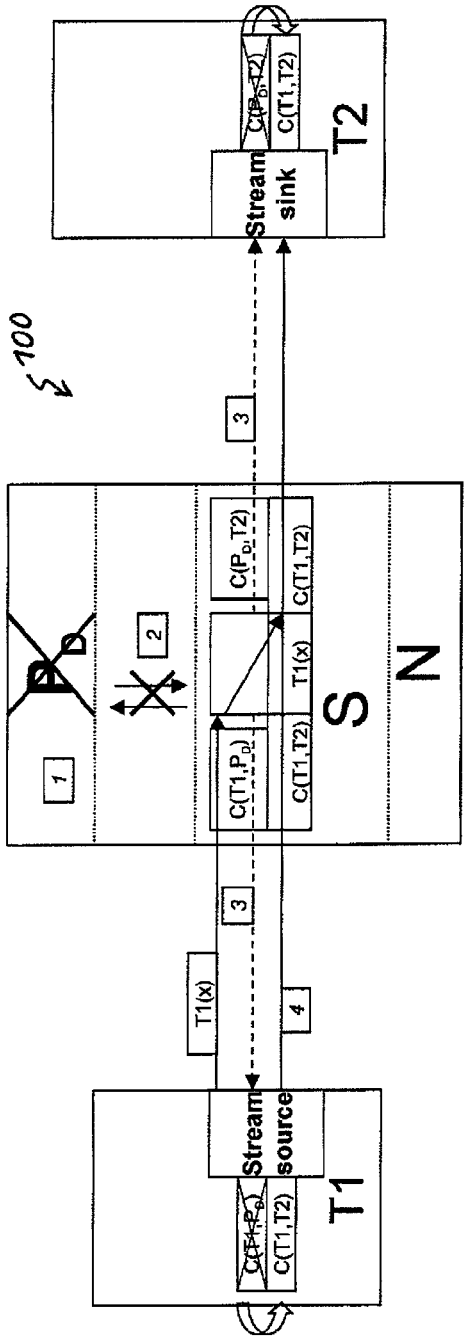
FIG. 7 is a schematic block diagram of a MMoIP system comprising a failed dialogue processor.

FIG. 7 is a schematic block diagram of stream processor failover in a MMoIP system comprising a failed dialogue processor $P_D$. As a precondition, a dialogue processor service $P_D$ was added to a connection to handle a MMoIP packet stream dialogue D(x) comprising the MMoIP packet stream T1(x). When the dialogue processor $P_D$ fails (step 1), the MMoIP switch S detects the failure (step 2), e.g. an Ethernet link or blade failure is detected by missing packets from the dialogue processor service $P_D$. The MMoIP switch S indicates the failure of the dialogue processor $P_D$ to the endpoints T1 and/or T2 (step 3). Then in step 4, the MMoIP packet stream T1(x) falls back to the connection C(T1, T2) without a processing of the MMoIP packet stream T1(x) by the dialogue processor $P_D$. The same procedure correspondingly applies to the MMoIP packet stream T2(x) in the dialogue D(x) and also for other uni-directional and/or bi-directional dialogues D(x), D(y), etc. which are transmitted in the MMoIP system.

A dialogue processing node failure where all the processor P is affected can be detected in one of the following ways a) to c). a) For a unidirectional MMoIP packet stream T1(x) on a connection $C(T1,P_D)$, a dialogue processing node failure can be detected when a stream source T1 receives an ICMP destination unreachable message (ICMP=Internet Control Message Protocol); b) For a unidirectional stream sink at a second endpoint T2 a dialogue processing node failure can be detected by using $T2(P_D)$ to ping, in case of suspended stream due to inactivity; c) Detection of network operator failover, i.e. the packets of a MMoIP packet stream T1(x) can be simply routed from the first endpoint T1 to the second endpoint T2 without implications. In case of a dialogue processing node failure, a failover can be a fall-back of all MMoIP packet streams $T\alpha(x)$ in a dialogue D(x) to a connection $C(T\alpha,T\beta)$ if an endpoint $T\beta$ is in the dialogue D(x). Another failover would be re-instantiating the service on another MMoIP switch $P_D'$ with an indication as described above with regard to the dialogue processing shown in FIG. 5.

Figure 8:
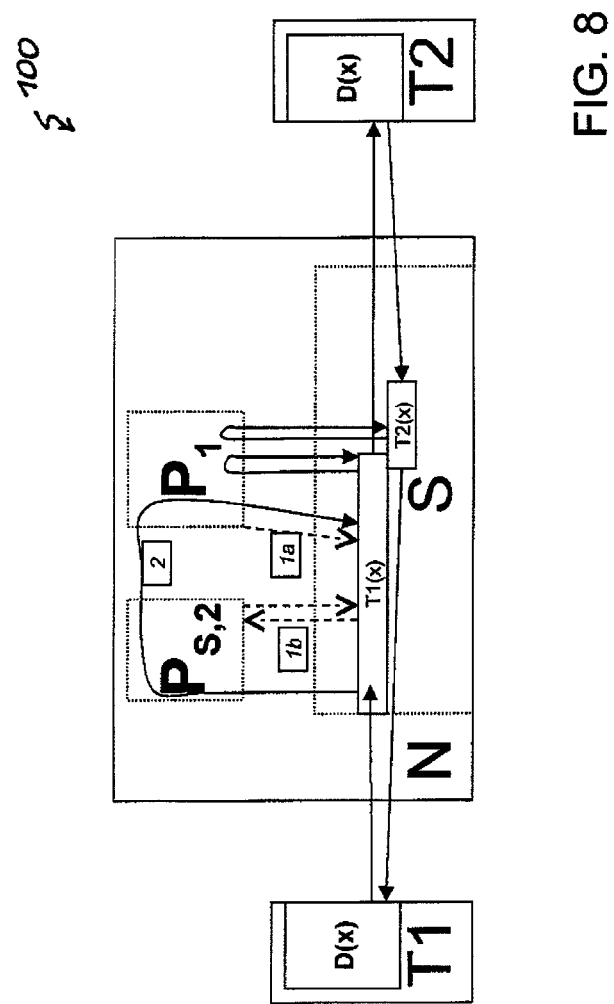
FIG. 8 is a schematic block diagram of a MMoIP system comprising a processor and an additional stream processor.

FIG. 8 is a schematic block diagram of a MMoIP system comprising a processor and an additional stream processor on a single node N. As a precondition, a stream or dialogue processor service $P_1$ was added to the node N of a MMoIP system to handle the MMoIP packet stream T1(x) or a dialogue D(x). In step 1, the processor service $P_1$ sets up an additional stream processing service $P_{S,2}$ in the node N to service the MMoIP packet stream T1(x). In step 1a, the processor service $P_1$ indicates to the MMoIP switch S the need of an additional stream processing service $P_{S,2}$ on the MMoIP packet stream T1(x). In step 1b, the MMoIP switch S instantiates an additional stream processing service $P_{S,2}$ in the node N and configures the additional stream processing service $P_{S,2}$ to send its output to the processor service $P_1$. When the additional stream processing service $P_{S,2}$ signals ready, the MMoIP switch S redirects, in step 2, further data of the MMoIP packet stream T1(x) to the additional stream processing service $P_{S,2}$. The additional stream processing service $P_{S,2}$ sends its output to the processor service $P_1$. The processor service $P_1$ sends its output back to the MMoIP switch S for forwarding it to the second endpoint T2.

The same method correspondingly applies for multiple MMoIP packet streams $T_i$ and collectively for a dialogue $D_i$. The MMoIP switch S chooses whether to instantiate a single processor or distribute the streams across multiple processors.

The instantiation of an additional dialogue processor substantially works in the same way as adding an additional stream processor describes above. In case of an additional dialogue processor however, the processor service $P_1$ uses the signalling stream $P_1(T1)$ on the connection $C(T1,P_1)$ as described above with regard to the dialogue processing, shown in FIG. 5, to indicate a requirement of a dialogue service.

An additional dialogue service can be instantiated to add additional parties. This is reflected in the indication, as a requirement, to allow any MMoIP switch on the way of the connection $C(T1,P_1)$ to detect whether it is in a suitable location/condition to pre-empt/service the indication.

Accordingly, an indication works as the indication of an additional stream processor, except that the processor service $P_1$ indicates that it wants to defer multiple existing MMoIP packet streams Ti(x) of a dialogue D(x) to a dialogue processor. Any MMoIP switch on the way of the connection $C(T1, P_1)$ can choose whether it is in a suitable location/condition to pre-empt/service the indication.

Further, a dialogue processor $P_A$ can use any existing signalling connection $C(P_A,P_B)$ if the processor $P_B$ is part of the dialogue D(x) to handover MMoIP packet streams Tl(x) of the dialogue D(x) that the a dialogue processor $P_A$ currently multiplexes.

FIG. 9 is a schematic block diagram of a MMoIP system with a multi-party dialogue, e.g. a telephone conference. Three parties, i.e. a first endpoint T1, a second endpoint T2 and a third endpoint T3, have switched from end-to-end communications between each other to use a dialogue processor $P_D$ in order to communicate in a multi-party dialogue D(x) with one stream each {T1(x), T2(x), T3(x)}. Dotted arrows refer to communication before the switch, solid arrows refer to communication after the switch to a dialogue processor $P_D$. Fallbacks, e.g. C(T1,T3) are just inactive, indicated by the dotted arrows, but would be able to extract data if a stream packet with the respective MMoIP packet stream arrives, e.g. a T3(x) packet at the connection C(T1,T3).

FIG. 10 is a schematic block diagram of a MMoIP system with a dialogue processor multiplexing. A dialogue processor $P_D$ can multiplex MMoIP packet stream data to combine MMoIP packet streams, e.g. by audio/video/text mixing. For the dialogue processor stream $P_D(x)$ at the endpoints, corresponding fallback stream endpoints are available to switch to in case of a failure, e.g. a temporary unavailability.

Figure 11:
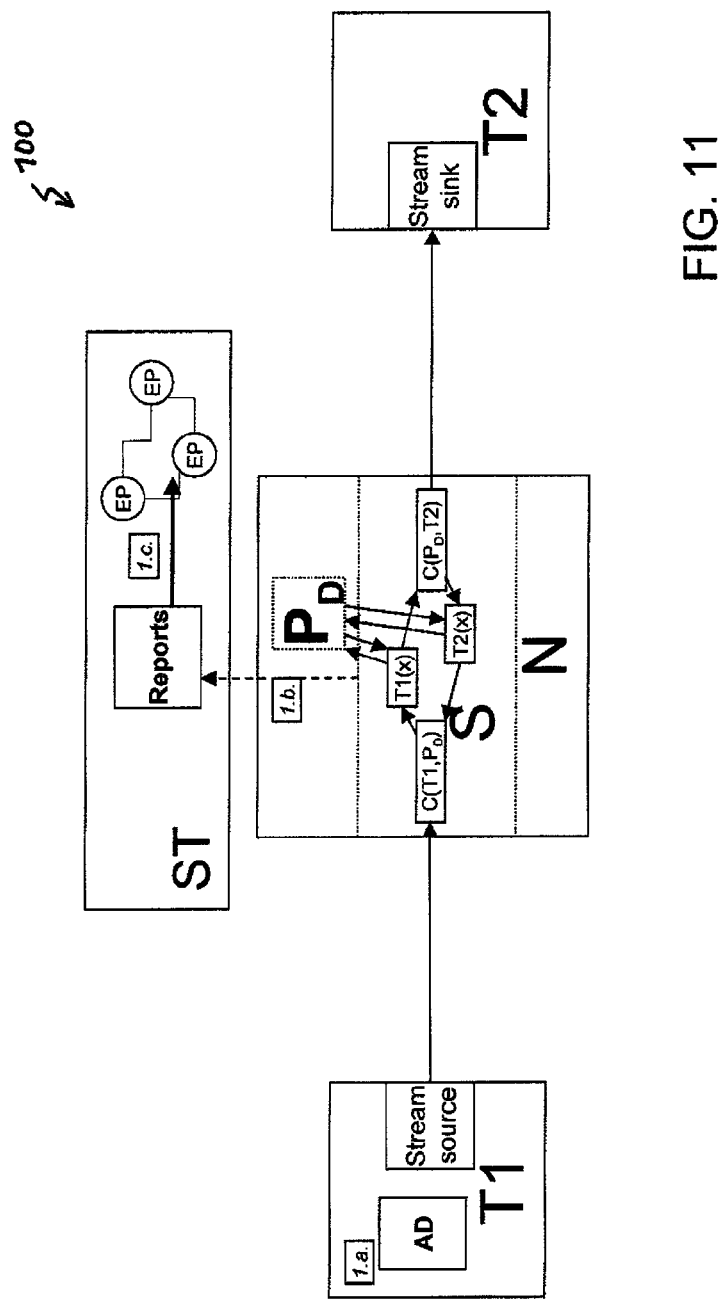
FIG. 11 is a schematic block diagram of a MMoIP system with collaboration detection.

FIG. 11 is a schematic block diagram of a MMoIP system with a collaboration detection. In a first step 1.a., an activity detection AD at a stream source T1 is used, as in VAD (=Voice Activity Detection), to limit the number of stream packets transmitted to a stream sink T2. Preferably, in case of the activity detection AD detecting that there exist no MM data at the stream source T1 to be transmitted to the stream sink T2, no MMoIP packets are generated. For example, in case of a VoIP telephone call, if a telephone caller associated with the first endpoint T1 does not speak, no VoIP packets are generated and sent from the first endpoint T1.

In a second step 1.b., the MMoIP switch S measures the activity of an endpoint T1, T2 in collaboration with one or more other endpoints in terms of time during which a user associated with the endpoint T1, T2 has sent data in a MMoIP packet stream, e.g. T1(x). Communication endpoints T1, T2 can be classified by their IP address in the endpoint tuple EP to be either part of the switching system or external to the switching system. When the MMoIP switch S holds a connection C(X,Y) and either the endpoint X or the endpoint Y is a communication endpoint outside of the switching system, i.e. an external endpoint, the MMoIP switch S preferably measures an activity of the external endpoint and reports it to a storage facility ST for correlation.

Further, whenever the MMoIP switch S pre-empts/services an indication to setup or remove a dialogue processor $P_D$, to add a MMoIP packet stream or remove a MMoIP packet stream from the dialogue processor $P_D$, it preferably stores associated time data and data associated with changes in the dialogue participation to the storage facility ST.

In a third step 1.c., the MMoIP switch S correlates the above mentioned data from the storage facility ST to derive collaboration data of the endpoints T1, T2, e.g. a collaboration graph which indicates which endpoints are communicating and how actively.

In a fourth step 1.d., the MMoIP switch S derives the Pareto-optimal location of pre-empting/serving indications from an endpoint T1, T2 and targeted to an endpoint T1, T2 under consideration of a collaboration activity, processing resource availability and network resource availability.

The MMoIP system is adapted to measure an endpoint activity and a dialogue creation to eventually create a collaboration graph. First, the collaboration graph may be is used by the MMoIP system to self-optimize a resource utilization by the MMoIP system, e.g. by deriving Pareto-optimal locations for processing of streams and dialogues, by relocating processing elements and by routing MMoIP packet streams to reach a more efficient network/computational resource utilization. Second, the MMoIP system is adapted to provide segments of the collaboration graph to affiliated endpoints as information. Third, the MMoIP system is adapted to use the endpoint activity and collaboration graph for accounting. The MMoIP system may use endpoint activity and collaboration data, such as collaboration traces, to self-optimize the utilization of resources. The MMoIP system leverages inter-endpoint collaboration activity for optimization of resource utilization.

The invention claimed is:

1. A method of providing an MMoIP communication service, comprising:
   transmitting one or more MMoIP packet streams established between a first endpoint of an IP communication network and a second endpoint of the IP communication network, whereby the one or more MMoIP packet streams comprise MMoIP payload data and/or control data;
   inserting control data directed to a processor in at least one MMoIP packet stream of the one or more MMoIP packet streams at the first endpoint and/or the second endpoint;
   transmitting the one or more MMoIP packet streams via an MMoIP switch of the IP communication network;
   monitoring, by the MMoIP switch, the one or more MMoIP packet streams;
   detecting, by the MMoIP switch, the control data directed to the processor; and
   forwarding, by the MMoIP switch, the detected control data to the processor;
   indicating, by the processor, a need for an additional processor to the MMoIP switch;
   triggered by the said indication received from the processor, instantiating, by the MMoIP switch, the additional processor;
   re-directing, by the MMoIP switch, the at least one MMoIP packet stream to the additional processor; and
   sending, by the additional processor, its output of the at least one MMoIP packet stream-to the processor.

2. The method of claim 1, wherein the method further comprises:
   inserting control data from the processor into at least one MMoIP packet stream of the one or more MMoIP packet streams.

3. The method of claim 1, wherein the method further comprises:
   processing, by the processor, at least one MMoIP packet stream of the one or more MMoIP packet streams.

4. The method of claim 3, wherein the control data which are forwarded by the MMoIP switch to the processor control the processing of the at least one MMoIP packet stream of the one or more MMoIP packet streams by the processor.

5. The method of claim 1, wherein monitoring, by the MMoIP switch, the one or more MMoIP packet streams comprises:
   executing a packet inspection of the one or more MMoIP packet streams packet per packet; and
   distinguishing payload data and control data.

6. The method of claim 1, wherein the method further comprises:
   inserting, at the first endpoint and/or the second endpoint, an indication in at least one MMoIP packet stream of the one or more MMoIP packet streams;
   detecting, by the MMoIP switch, the indication;
   triggered by the detected indication, setting up the processor for processing at least one MMoIP packet stream of the one or more MMoIP packet streams; and
   re-directing, by the MMoIP switch, the at least one MMoIP packet stream of the one or more MMoIP packet streams to the processor.

7. The method of claim 1, wherein the method further comprises:
   if the MMoIP switch detects a failure of the processor, stopping, by the MMoIP switch, the forwarding of the control data to the processor.

8. The method of claim 1, wherein the method further comprises:
   measuring, by the MMoIP switch, an activity of at least one of the endpoints in collaboration with one or more other endpoints in terms of a time during which a user associated with the at least one endpoint has sent MMoIP data in at least one of the one or more MMoIP packet streams;
   storing the measured activity data; and
   correlating, by the MMoIP switch, the stored activity data to derive collaboration data of the endpoints.

9. A MMoIP system for providing an MMoIP communication service in an IP communication network, comprising:
   a first endpoint and a second endpoint which are adapted to,
      send one or more MMoIP packet streams via a connection established between the first endpoint and the second endpoint and to
      insert control data directed to a processor in at least one MMoIP packet stream of the one or more MMoIP packet streams,
      whereby the one or more MMoIP packet streams comprise MMoIP payload data and/or control data,
   an MMoIP switch adapted to,
      monitor the one or more MMoIP packet streams which are transmitted via the MMoIP switch,
      detect the control data directed to the processor,
      forward the detected control data to the processor; and
      wherein the processor is adapted to
      indicate a need for an additional processor to the MMoIP switch, wherein the MMoIP switch is further adapted to,
         instantiate the additional processor, based on the indication received from the processor,
         re-direct the at least one MMoIP packet stream to the additional processor,
         wherein the additional processor is adapted to, send output of the at least one MMoIP packet stream-to the processor.

10. The MMoIP system of claim 9, wherein the processor is a stream processor adapted to process at least one MMoIP packet stream of the one or more MMoIP packet streams and/or a dialogue processor adapted to process a bidirectional dialogue between the first endpoint and the second endpoint.

11. The MMoIP system of claim 9 wherein the MMoIP system further comprises the processor.

12. The MMoIP system of claim 9, wherein the MMoIP system further comprises a storage facility adapted to receive data from the MMoIP switch and store the received data.

* * * * *